April 16, 1968 KIMIO HATASHITA 3,378,031
REVERSIBLE SOLENOID-OPERATED VALVE ASSEMBLY
Filed July 19, 1966
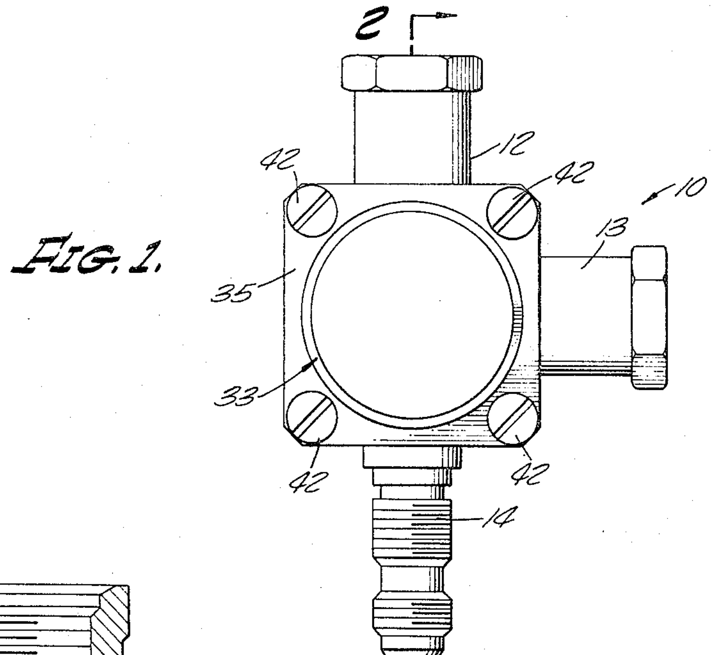
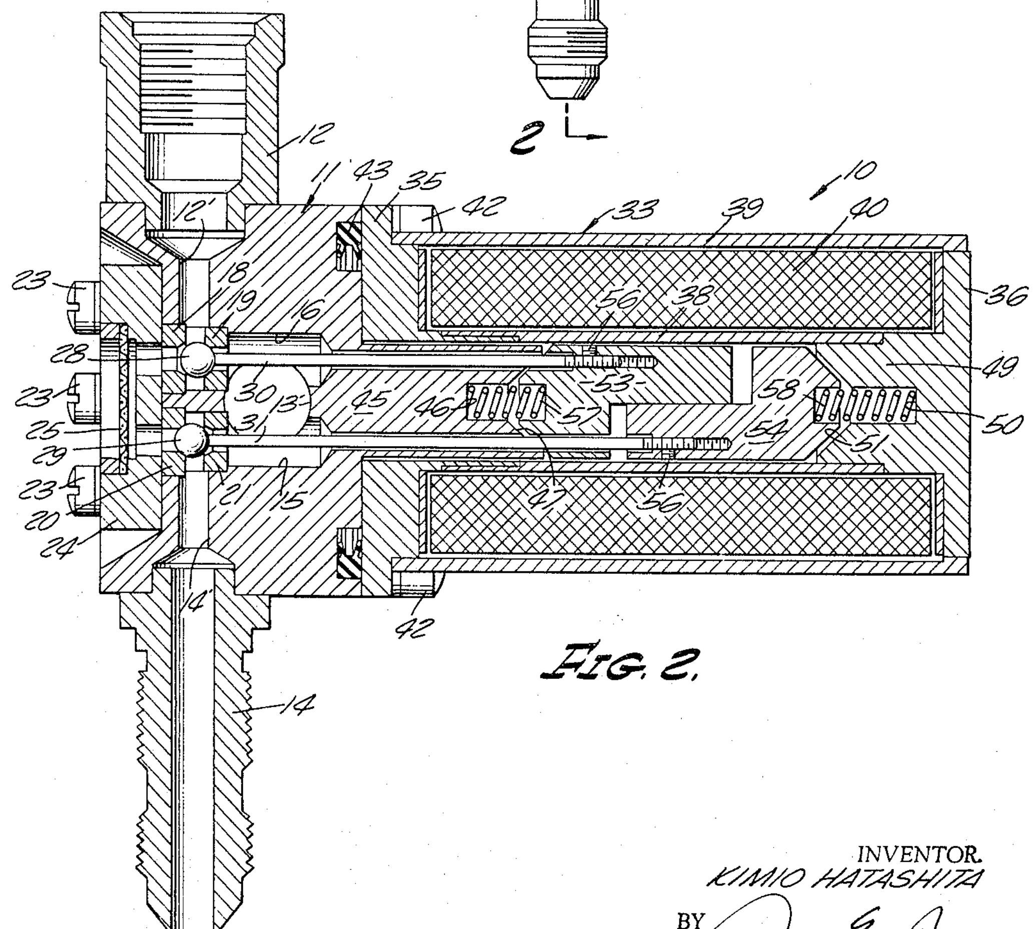
INVENTOR.
KIMIO HATASHITA
BY
ATTORNEYS United States Patent Office 3,378,031

Patented Apr. 16, 1968

3,378,031

REVERSIBLE SOLENOID-OPERATED VALVE ASSEMBLY

Kimio Hatashita, Gardena, Calif., assignor to Rocker Solenoid Company, Wilmington, Calif., a corporation of California Filed July 19, 1966, Ser. No. 566,313
8 Claims. (Cl. 137—596.17)

This invention relates to valves and more particularly to an improved high-efficiency solenoid-operated valve assembly arranged to operate a plurality of valves in synchronism from a common actuator.

There has been proposed heretofore a large variety of electrically operated valves. However, there has been lacking a suitable high-efficiency electrically actuated device utilizing a common coil arranged to simultaneously reverse the positions of a plurality of valves and operating with equal effectiveness and certainty, when the coil is de-energized, to again reverse the position of each of the valves.

Accordingly, there is provided by the present invention a simple, lightweight, rugged and highly reliable solenoid valve assembly having a single actuating coil operatively associated with a pair of identical armature members of a unique design operatively connected to separate valve members. Spring means between the respective pole faces and the adjacent ends of the armature members serve to hold the armature members normally retracted toward one another and in position to seat against the respective pole pieces instantly that a solenoid coil is energized. As herein shown by way of example, the two valve members are arranged in side-by-side relation within a common housing and are movable through short distances between a pair of valve seats and arranged, by way of example, as a four-way valve control for hydraulic cylinder. The coil is hermetically sealed within its magnetic housing structure and the armature space is in restricted communication with the interior of the valve housing thereby obviating packing and friction losses occasioned thereby and heretofore often provided about the operating connectors between the armatures and the valve members.

It is therefore a primary object of the present invention to provide an improved high-efficiency positive-action solenoid actuator arranged to operate a plurality of valves simultaneously.

Another object of the invention is the provision of an improved solenoid valve utilizing a single coil to actuate a plurality of valves between alternate positions thereof.

Another object of the invention is the provision of a four-way valve utilizing a single solenoid actuator featuring a pair of similar armature members movable in opposite directions and each connected to a separate valve.

Another object of the invention is the provision of an improved solenoid valve having an extendable-contractable armature formed in two parts and having a continuous flux path passing therethrough in both the extended and contracted positions of its parts.

These and other more specific objects will appear upon reading the following specification and claims and upon considering in connection therewith the attached drawing to which they relate.

Referring now to the drawing in which preferred embodiment of the invention is illustrated.

FIGURE 1 is a top plan view of one preferred embodiment of the invention solenoid employed to operate a valve assembly; and FIGURE 2 is a cross-sectional view taken along line 2—2 on FIGURE 1 showing the position of parts with the solenoid de-energized.

Referring to FIGURES 1 and 2 there is shown a representative embodiment of the invention as embodied in a valve assembly designated generally 10. This assembly includes a one-piece valve housing 11 of high permeability magnetic material provided with three fluid connections 12, 13 and 14, respectively, opening into flow passages 12', 13', 14', formed interiorly of the housing.

Opening into body 11 from its left hand end as viewed in FIGURE 2 are a pair of deep wells 15, 16 each having a pair of stepped counterbores at their outer ends respectively supporting pairs of valve seat members 18, 19, 20, 21. These valve seats have a fluid-tight press fit with the counterbores and preferably bonded or silver soldered in place. Clamped over the outer ends of bores 15 and 16 by screws 23 is an apertured closure plate 24 equipped with a screen 25. If desired, plate 24 may be replaced by a suitable fitting for connection to a hose, conduit or the like.

Movably seated between the four valve seats, 18, 19, 20, 21, are a pair of spherical valve members 28, 29 each attached to an operating rod 30, 31.

The high-efficiency solenoid actuator, designated generally 33, for valves 28, 29 comprises a pair of end plate members 35 and 36 having axial extensions projecting toward one another. The two end plate members 35, 36 are interconnected by inner and outer tubes 38 and 39, hermetically sealed to the end plates by brazing, silver solder or the like. Of importance is the fact that plate members 35, 36 and outer tube 39 are formed from high permeability material whereas inner tube 38 is formed of nonmagnetic material, such as stainless steel, aluminum, brass or the like. Prior to the assembly of outer tube 39, the solenoid assembly is provided with a solenoid coil 40 the terminals of which are connected through suitable insulated bushings mounted in the solenoid housing in a well known manner, though not shown in the present drawing.

Inner end plate 35 is held secured to main body 11 by clamping screws 42 best shown in FIGURE 1. To assure a fluid-tight fit, body 11 is preferably provided with a groove seating an O-ring or other suitable gasket 43. Main body 11 includes an outwardly projecting cylindrical boss 45 provided at its outer end with a well 46 opening into a conical counterbore 47. Boss 45 and the adjacent portion of housing 11 is in direct contact with end plate 35 with the result that it forms a pole piece of high permeability at one end of the solenoid. Boss 45 and end plate 35 cooperate with one another in forming one of the pole pieces of the solenoid and, taken together, are herein termed one of the two end plate means of solenoid 33. The outer end plate 36 likewise has an inwardly extending boss or pole piece 49 provided with a well 50 opening into a counterbore 51.

Loosely and slidably supported within tube 38 between pole pieces 45, 49 are a pair of generally identical L-shaped soft iron armature members 53, 54. These members have relatively short cylindrical legs remotely spaced from one another and their longer legs in overlapping relation to one another. These longer legs are semi-circular in cross-section and the flat adjacent faces will be understood as in close wiping and sliding contact with one another. These contacting surfaces are smooth and polished and preferably include a film of silicon or the like lubricant to facilitate their relative movement thereof. Each armature member is provided with a threaded well seating the threaded end of valve actuator rods 30, 31 which extend through loose fitting passages therefor formed in boss or pole piece 45. Once these rods are properly adjusted in the respective armature members 53, 54, they may be locked in place in any suitable manner, as by set screws 56.

The remotely spaced ends of the armature members are provided with conical ends complemental in shape to conical counterbores 47, 51 in the two pole faces. In addition, each armature member has a counterbore aligned with wells 46, 50 seating light compression springs 57, 58, spring 57 being effective to urge valve 28 normally against seat 19 and spring 58 being effective to urge valve 29 against seat 20. It will also be observed that the springs normally hold the armatures retracted toward one another and in closely spaced relation from the conical seats in pole members 45, 49.

In the operation of the described solenoid valve assembly 10, let it be assumed that the assembly is being used as a four-way valve controlling the operation of a pneumatic cylinder, not shown. Under these circumstances, connection 13 would be connected to a source of pressurized fluid whereas connections 12 and 14 would be connected through suitable fluid lines with the opposite ends of the cylinder being controlled. The outlet openings through closure plate 24 and screen 25 could then be vented to the atmosphere if air is used as the operating fluid, or to a return fluid line if pressurized liquid is being used as the operating fluid.

In the position of the parts shown in FIGURE 2, valve 28 is closed to the right whereas valve 29 is closed to the left. Under these circumstances, the pressurized fluid entering through connection 13 can exit only past seat 21 and outwardly through connection 14 into one end of the cylinder. At the same time fluid from the opposite end of the cylinder exhausts through its connection 12, flows past valve 28 and seat 18 and outwardly through the vent openings in plate 24.

If the operator wishes to reverse the operation of the cylinder he merely energizes solenoid coil 40. Magnetic flux then flows in known manner through the magnetic flux circuit between pole pieces 45, 49 and across the gap between the conical remote ends of armature members 53, 54. Instantly that this flux path is created, the two armature members are attracted toward and seat firmly against the conical seats in the pole pieces in opposition to springs 57 and 58. During this movement the only high-reluctance gap in the flux circuit is the extremely short gap between the pole faces and the adjacent ends of the armature members, it being understood that the juxtaposed flat surfaces between the longer legs of the armatures are in direct wiping contact with one another. Accordingly, the two armature members move in opposite directions simultaneously and into engagement with the pole faces. They are held truly centered axially of the solenoid during this operation both by the action of the springs 57, 58 and by the cooperating action of the juxtaposed conical surfaces on the armature and the pole faces. As this occurs the movement is transmitted by connector rods 30, 31 to valves 28, 29, reversing the position of the valves and seating valve 28 against seat 18 and valve 29 against seat 21. It follows that the high pressure fluid now flows past valve 28 and outwardly through connector 12 to the opposite end of the cylinder whereas fluid from the other end of the cylinder exits and flows into the valve assembly through connector 14, past valve 29 and through the vent openings.

Although the described high-sensitivity, high-efficiency solenoid actuator is here disclosed as operating a pair of valves, it will be understood that it is equally suitable for operating switches, lever systems and a wide variety of control devices.

While the particular reversible solenoid-operated valve assembly herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A solenoid valve assembly comprising a housing enclosing a pair of independent valve members movable toward and away from respective valve seat means for said valves, solenoid means for simultaneously operating said valves, said solenoid means having a pair of inner and outer tubes and end plate means thereacross enclosing therebetween a solenoid coil, the midportion of said inner tube being of nonmagnetic material and the remainder of said tubes and end plates being of magnetic material, a pair of L-shaped armature members slidably supported within said inner tube, the shorter legs of said L-shaped armature members being remote from one another and the longer legs thereof being in close overlapping sliding contact with one another centrally of said inner tube, means connecting each of said armature members to a respective one of said valve members, spring means acting on each of said armature members and urging the latter toward retracted position with their remotely positioned shorter legs out of contact with the adjacent one of said plate means, and the energization of said solenoid coil being effective through magnetic flux created thereby to extend said armature members axially in opposite directions and their shorter legs into intimate contact with said end plate means, thereby to reverse the positions of each of said valve members.

2. Solenoid valve as defined in claim 1 characterized in that said valve members are located adjacent one end of said solenoid coil, and said means connecting said valve members to a separate one of said armature members extending through one end of said inner tube.

3. A solenoid valve as defined in claim 1 characterized in that the remotely spaced ends of said L-shaped armature members are conical in shape and cooperate with complementally shaped seats therefor formed on the juxtaposed surfaces of said end plate means.

4. A solenoid valve as defined in claim 3 characterized in that said spring means comprises separate compression springs interposed between the complementally shaped remote ends of said L-shaped armature members.

5. A solenoid valve as defined in claim 4 characterized in that said housing is of non-magnetic material, and resilient seat means interposed between said housing and the adjacent end plate means of said solenoid housing.

6. A solenoid valve as defined in claim 5 characterized in that said valve members are arranged to be in opposite positions relative to one another when said coil is energized and when it is de-energized.

7. A solenoid valve as defined in claim 6 characterized in the provision of a pair of valve seats for each of said valve members with the seats of each pair disposed on the opposite side of the associated valve member in the direction of movement of the latter, and said armature members being operable when said coil is energized to shift each of said valve members from a seated position on one valve seat to a seated position on the other of its valve seats.

8. A solenoid actuated control assembly having two stable positions, said assembly comprising a generally cylindrical housing formed of magnetic material enclosing a single coil and including a pair of pole pieces projecting toward one another inwardly from the opposite ends of said coil, tube means of non-magnetic material extending between these pole pieces and providing part of the support and housing for said coil, a pair of similar L-shaped armature members of soft iron reciprocably supported between said pole pieces and including spring means between their remotely-spaced shorter legs and a respective one of said pole pieces effective to hold said armature members in retracted position and out of contact with said pole pieces, the longer legs of said L-shaped armature members having smooth broad surfaces in sliding contact with one another centrally of said inner tube, separate control means operatively connected to a separate one of said armature members, and the energization of said coil being effective to repel said armature members to their extended positions wherein their shorter legs are seated against the adjacent one of said pole pieces.

References Cited

UNITED STATES PATENTS

| | | | |
|---|---|---|---|
| 1,619,677 | 3/1927 | Pierce | 310—24 XR |
| 2,891,577 | 6/1959 | Stewart | 251—141 XR |
| 2,991,799 | 7/1961 | Littlefield | 137—595 |

HENRY T. KLINKSIEK, *Primary Examiner.*